Feb. 25, 1958
L. L. EXTROM
2,824,763
ADJUSTABLE SUN SHIELD FOR ATTACHMENT TO A SUN VISOR
Filed May 3, 1956
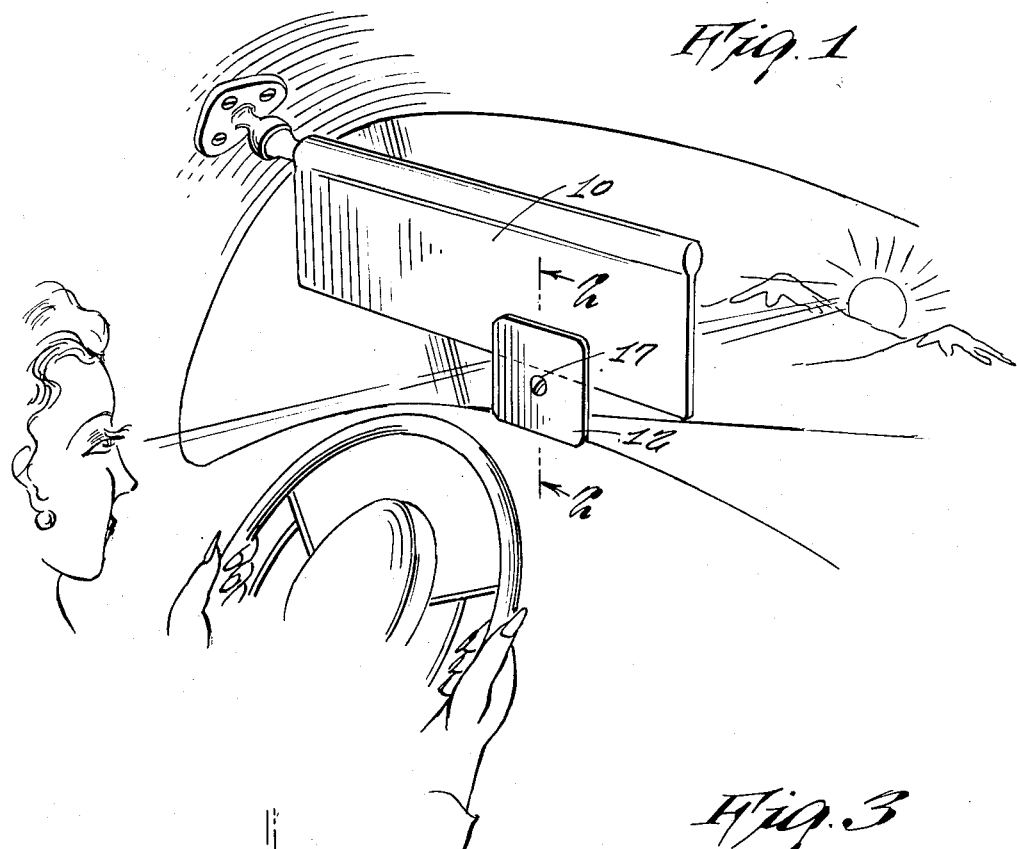
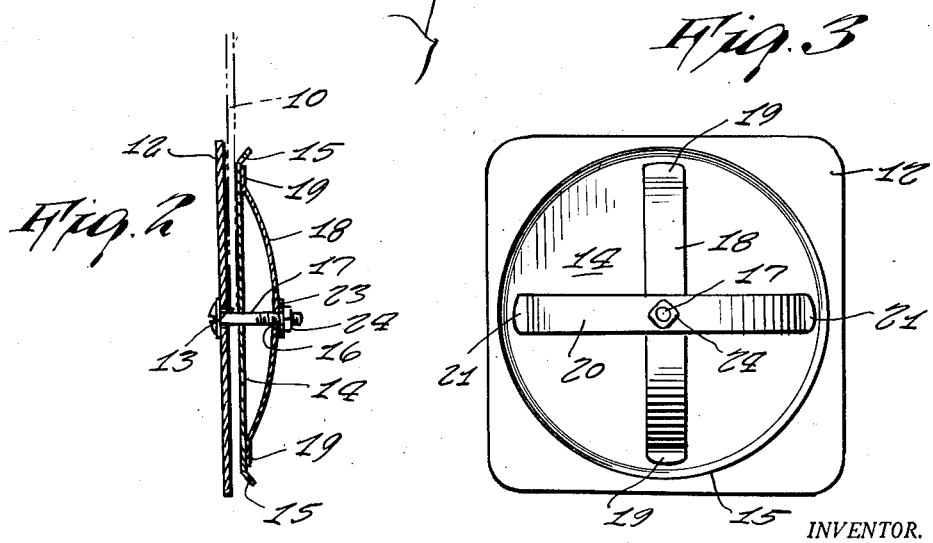
INVENTOR.
LLOYD L. EXTROM
BY
Carl Miller
ATTORNEY

United States Patent Office 2,824,763
Patented Feb. 25, 1958

2,824,763
ADJUSTABLE SUN SHIELD FOR ATTACHMENT TO A SUN VISOR

Lloyd L. Extrom, Morongo Valley, Calif.

Application May 3, 1956, Serial No. 582,602

1 Claim. (Cl. 296—97)

This invention relates to sun shields and, more particularly, to sun shields for use with automotive vehicles.

Ordinarily, the blinding sunlight and glaring headlights of vehicles can cause fatigue to the driver of the vehicle, whereby accidents and injury can some times follow. An object of this invention, therefore, is to provide an adjustable sun shield for automotive vehicles that is simple in construction, efficient in operation, and which will overcome the aforementioned difficulties.

Another object of this invention is to provide an adjustable glare shield for automotive vehicles that may be readily adjusted by the driver so as to block out the blinding rays of the sun and oncoming vehicle headlights, without distracting the driver's attention.

All of the foregoing and still further objects and advantages of this invention will become apparent from a study of the following specification, taken in connection with the accompanying drawings, wherein:

Figure 1 is a perspective view of the interior of an automobile showing a glare shield made in accordance with this invention in operative position therein;

Figure 2 is a cross-sectional view taken along line 2—2 of Figure 1; and

Figure 3 is a rear view of the device shown in Figure 1.

Referring now to Figure 1 of the drawing, a glare shield made in accordance with this invention is shown in operative position in engagement with a conventional sun visor 10, the glare shield, as more clearly shown in Figure 2, includes a flat shield plate 12 having a centrally disposed opening 13 extending therethrough. The shield plate 12 may be constructed of any suitable material such as translucent glass or plastic which will effectively prevent the transmission of harmful rays therethrough. A flat clamping plate 14 having a circumferentially disposed flange 15 and a centrally disposed opening, is adapted to be connected to the flat shield plate 12 by means of a bolt 17 that extends through the aligned openings 13, 16 in the respective shield plate and leaf spring members. A pair of leaf spring members 18, 20 are carried by the outer end of the bolt 17 in a criss-cross relationship. The outer extremities of the leaf spring 18 are in the form of flanges 19, as are the outer extremities 21 of the second leaf spring 20, which flanges flatly engage the outer surface of the clamping plate 14 adjacent to the circumferential flange 15 thereof. The leaf springs are secured in proper assembled position by means of a washer 23 and nut 24 threaded on to the exterior end of the bolt.

In operation, the nut 24 is tightened down to the bolt sufficiently to set up an initial pressure in the leaf springs 18, 20. Prior to assembly or use, the clamping plate 14 is urged into flat engagement with the shield plate 12 under the action of the leaf springs. When applied to a sun visor 10 as shown in Figure 1, the sun visor is guided between the shield plate and clamping plate by the inclined flange surfaces 15 of the clamping plate. It will be recognized, that the shield may be rolled or slid from one position to another on the sun visor 10 without tearing or binding because of the guiding action of the flange 15.

While this invention has been described with particular reference to the specific form as shown in the drawing, it is to be understood that such is not to be construed as imparting limitations upon the invention, which is best defined by the claim appended hereto.

Having thus described my invention, I claim as new and desire to secure by Letters Patent:

In combination with a sun visor having a universal joint connection mounting said visor within an automotive vehicle, an adjustable glare shield adjustably supported upon said sun visor for reciprocating longitudinal sliding and rolling movement within the plane of said sun visor and for rotational movement about an axis extending perpendicularly to said plane, said glare shield comprising a shield plate, a clamping plate disposed adjacent to said shield plate, both of said plates having permanently aligned central openings, connecting means extending through said respective openings in said plates having one end adapted to engage one outer surface of said shield plate and having an opposite end adapted to engage one outer surface of said clamping plate, spring means urging both of said plates towards mating engagement with each other comprising a plurality of angularly adjustable leaf springs each having a centrally disposed opening for receiving said connecting means, the outer extremities of said spring means comprising outwardly turned flanges for flat face engagement with said clamping plate, and securing means carried by said connecting means for adjusting the pressure of said spring means to effect an adjustable clamping pressure between said clamping plate and said shield plate to maintain said glare shield in an adjusted position with respect to said sun visor.

References Cited in the file of this patent

UNITED STATES PATENTS

| | | |
|---|---|---|
| 160,260 | Disney | Mar. 2, 1875 |
| 2,150,703 | Stetson | Mar. 14, 1939 |
| 2,184,360 | Nichols | Dec. 26, 1939 |
| 2,252,716 | Levy | Aug. 19, 1941 |

FOREIGN PATENTS

| | | |
|---|---|---|
| 634,997 | France | Dec. 10, 1927 |
| 14,574 of 1889 | Great Britain | Sept. 17, 1889 |